(12) United States Patent
Kimura

(10) Patent No.: US 7,852,540 B2
(45) Date of Patent: Dec. 14, 2010

(54) OPTICAL SCANNING APPARATUS AND IMAGE FORMING APPARATUS USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/543,378

(22) Filed: Aug. 18, 2009

(65) Prior Publication Data

US 2010/0046056 A1    Feb. 25, 2010

(30) Foreign Application Priority Data

Aug. 22, 2008   (JP)   ............... 2008-213755

(51) Int. Cl.
   *G02B 26/08*   (2006.01)
(52) U.S. Cl. ................................. 359/201.1
(58) Field of Classification Search .... 359/204.1–207.1
   See application file for complete search history.

(56) References Cited

U.S. PATENT DOCUMENTS 6,801,239 B2   10/2004   Nakahata

2003/0234857 A1   12/2003   Nakahata
2006/0232844 A1*  10/2006   Nakajima .................. 359/204

FOREIGN PATENT DOCUMENTS

| JP | 07-199100 A | 8/1995 |
| JP | 2004-021133 A | 1/2004 |
| JP | 2004-317790 A | 11/2004 |

* cited by examiner

*Primary Examiner*—Euncha P Cherry
(74) *Attorney, Agent, or Firm*—Canon U.S.A., Inc. I.P. Division

(57) ABSTRACT

The light scanning optical apparatus for reducing registration displacement during a temperature increase, includes: multiple light source units; a common optical deflector deflectively scanning light fluxes emitted from the multiple light source units; and first and second imaging optical systems facing each other across an optical direction, sandwiching the optical deflector, and guiding the light fluxes from the optical deflector to different scanned surfaces; and a housing member housing each of the first and second imaging optical systems. Among imaging optical elements constituting those imaging optical systems, two imaging optical elements disposed adjacently to the optical deflector include main scanning direction standard positioning portions disposed at different positions in a scanning direction in those imaging optical systems. The main scanning direction standard positioning portions are positioned with respect to a standard reception portion of the housing member.

4 Claims, 8 Drawing Sheets

(UPSTREAM SIDE)     (DOWNSTREAM SIDE)

FIRST IMAGING OPTICAL SYSTEM

- ◆ REFRACTIVE FACTOR
- △ RADIATED POSITION DISPLACEMENT BY SHAPE FACTOR
- ☐ TOTAL RADIATED POSITION DISPLACEMENT

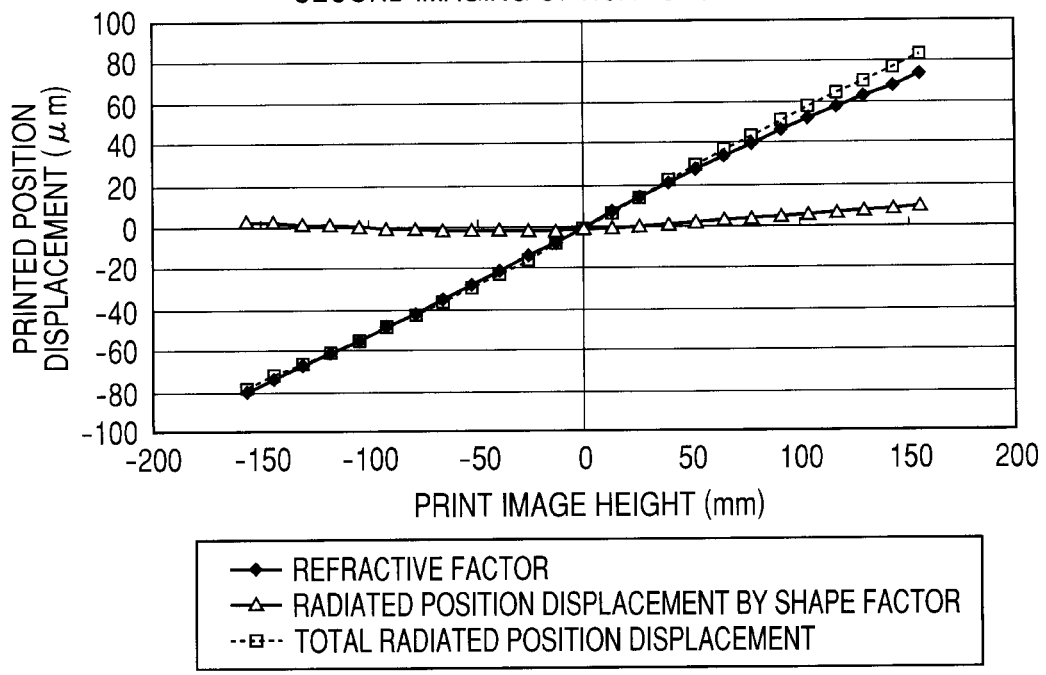
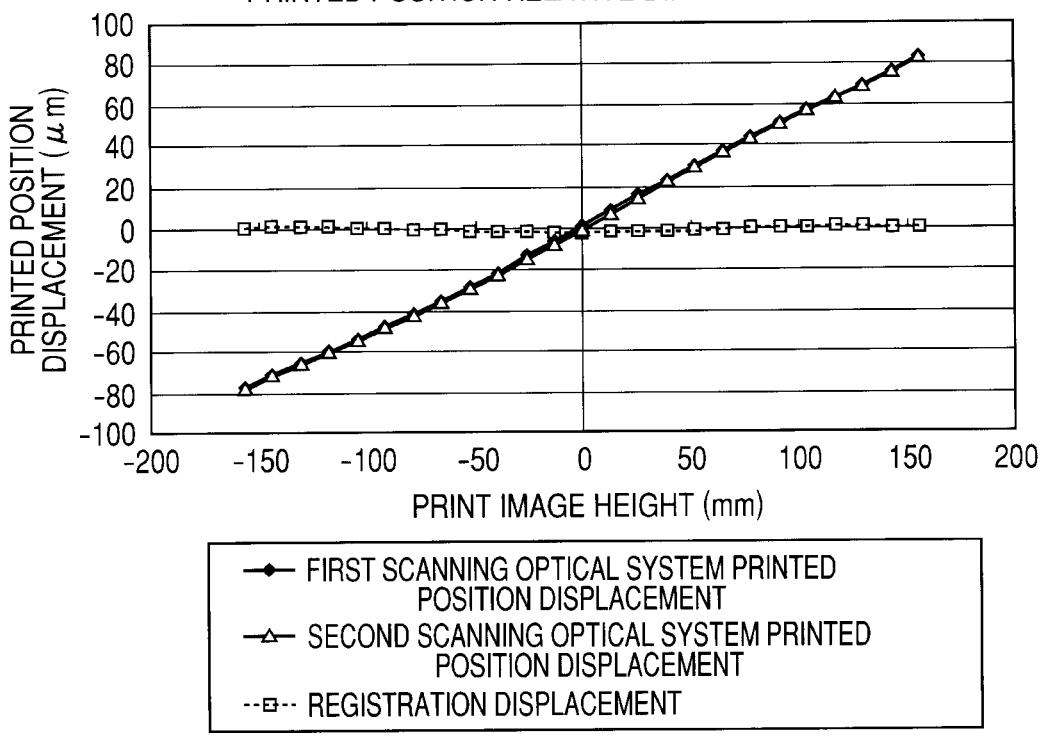

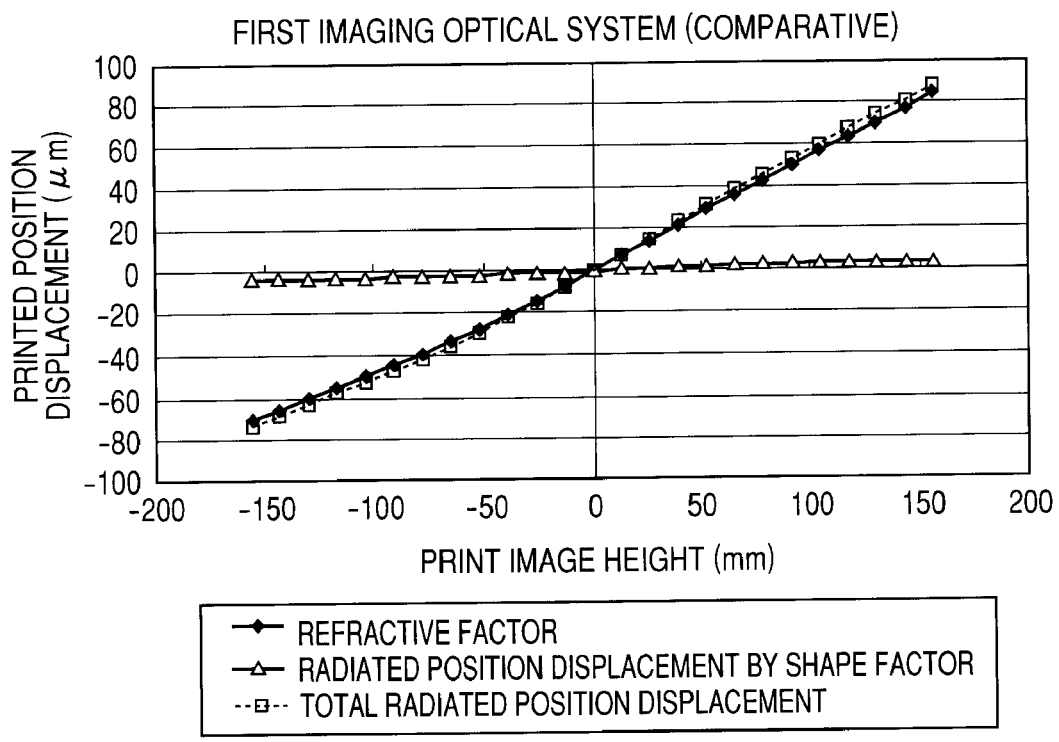
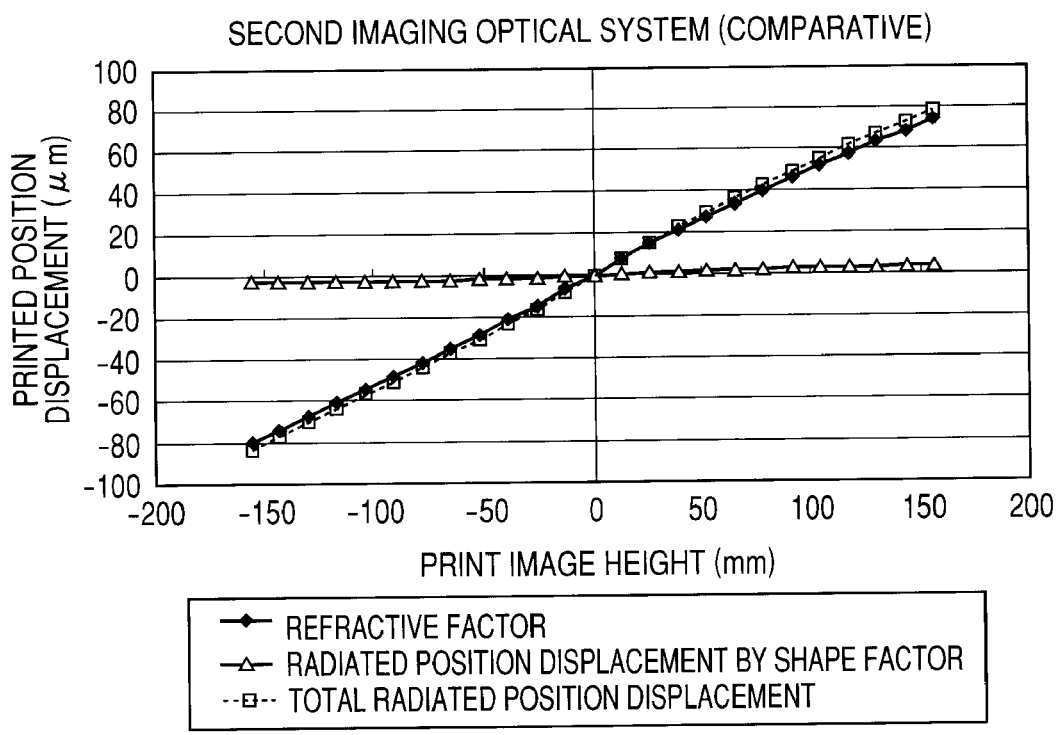

(UPSTREAM SIDE)    (DOWNSTREAM SIDE)

OPTICAL SCANNING APPARATUS AND IMAGE FORMING APPARATUS USING THE SAME

BACKGROUND OF THE INVENTION

1. Field of the Invention

The present invention relates to an optical scanning apparatus and an image forming apparatus using the same. The present invention is suitable for an image forming apparatus such as a laser beam printer, a digital copying machine, or a multi-function printer, which adopts an electrophotography process.

2. Description of the Related Art

Various color image forming apparatuses have conventionally been proposed, each of which includes a light source unit, multiple light scanning optical systems having imaging optical systems, and a deflection unit common among the multiple light scanning optical systems, and guides light fluxes emitted from the multiple light scanning optical systems onto multiple corresponding image bearing members to form a color image (see Japanese Patent Application Laid-Open No. 2004-021133 and Japanese Patent Application Laid-Open No. 2004-317790).

As an fθ lens used for such an optical scanning apparatus, a plastic lens has been applied for the purpose of easily producing a lens surface of an aspherical shape, which achieves highly accurate optical performance. Various methods have conventionally been proposed for accurately fixing a plastic lens to a casing (housing member) (see Japanese Patent Application Laid-Open No. H07-199100).

FIG. 13 is a main portion perspective view illustrating a method of fixing the plastic lens to the casing (housing member) proposed in Japanese Patent Application Laid-Open No. H07-199100.

In FIG. 13, a plastic lens 300 includes a lens portion 301 and a short side rib 302 and a long side rib 303 formed to surround the lens portion 301. On a side of the long side rib 303 to be abutted on a standard positioning surface 601 of a casing (housing member) 600, a protrusion 304 is disposed at a center position of a lens scanning direction (arrow X of FIG. 13). The protrusion 304 is fitted and engaged with a recessed part 602 of the casing (housing member) 600 to determine a position in the scanning direction. Thus, thermal expansion of the plastic lens 300 can be released to both ends by setting a center of the scanning direction X as a standard.

However, the optical scanning apparatus described above has the following problems.

During driving of a scanner motor to rotate a rotational polygon mirror, in the optical scanning apparatus, heat generated from an IC chip disposed on a substrate of the scanner motor or from the scanner motor causes a temperature increase and the rotation of the rotational polygon mirror generates an air flow, leading to a nonunfiorm temperature distribution.

Especially, the imaging lens disposed in proximity of the scanner motor is easily subject to the heat generated from the IC chip (motor driving circuit) disposed on the substrate of the scanner motor or from the scanner motor, and also to the air flow generated by the rotation of the rotational polygon mirror.

Air generated on a surface of the imaging lens flows from an image writing start side of the imaging lens surface to an image writing complete side thereof. Thus, in the imaging lens closest to the scanner motor, such a phenomenon occurs in which a temperature of the image writing start side of a scanning direction is higher than that of the image writing complete side.

FIG. 14 is a graph illustrating a result of measuring a surface temperature of the imaging lens when the scanner motor is continuously driven. As illustrated in the graph, a temperature difference of about 2° C. to 5° C. is generated between the image writing start side and the image writing complete side. The following problems occur when the temperature of the imaging lens asymmetrically increases in the scanning direction.

When a temperature of the plastic lens increases, a refractive index of a normal material decreases. The decreased refractive index reduces refractive power (power) of the imaging lens, and hence a beam reaching position on a scanned surface moves in a direction away from an optical axis, thereby increasing a so-called imaging magnification (printed width).

In addition to a change in refractive index, because of use of a resin material having a large linear expansion coefficient, the temperature increase is accompanied by expansion of a lens shape. When the plastic lens 300 expands with a center of the scanning direction X set as a standard as in the case of Japanese Patent Application Laid-Open No. H07-199100, a printed position moves in a direction away from an optical axis, increasing the imaging magnification (printed width).

As a result, the following problems occur especially in a color image forming apparatus illustrated in FIG. 15.

FIG. 15 is a main portion sectional view when a part of a conventional scanning unit is viewed from a rotational axis direction A of an optical deflector (polygon mirror).

As illustrated in FIG. 15, in a system that includes one shared optical deflector 28 and imaging lenses 29 arranged at the left and right of the optical deflector 28 and scans multiple scanned surfaces, an image writing start side and an image writing complete side are reversed between left and right imaging optical systems LB. In this configuration, a light emitted from a light source unit 25 passes through a collimator lens 26 and a cylindrical lens 27 to reach the optical deflector. As described above, the temperature increase of the imaging lens in proximity of the optical deflector is large at the image writing start side and small at the image writing complete side. Thus, a refractive index fluctuation or a beam reaching position fluctuation caused by thermal expansion is large at the image writing start side and small at the image writing complete side. As a result, the image writing start side and the image writing complete side are reversed at image ends (ends of the scanned surface) between the left and right imaging optical systems LB at the optical deflector 28, and hence a size relationship of printed position displacement is reversed at the images ends (ends of the scanned surface).

Thus, in the color image forming apparatus that superimposes multiple colors, imaged position displacement and registration displacement become conspicuous, and hence image quality is deteriorated.

Especially in recent years, a higher speed of the scanner motor that drives the optical deflector has been accompanied by a larger amount of heat generated from the IC chip or the scanner motor, and with miniaturization of the light scanning optical system, the imaging lens has been disposed in proximity of the heat-generating scanner motor to be more easily affected by heat.

SUMMARY OF THE INVENTION

The present invention provides an optical scanning apparatus capable of reducing printed position displacement at an image end during a temperature increase to reduce registration displacement, and an image forming apparatus using the same.

In order to achieve the above-mentioned object, an optical scanning apparatus includes: the plurality of light source units; a common optical deflector configured to deflectively scan the plurality of light fluxes emitted from the plurality of light source units; and a first imaging optical system and a second imaging optical system arranged, within a main scanning section, to face each other across an optical axis direction and to sandwich the common optical deflector, the first imaging optical system and the second imaging optical system being configured to image, on different surfaces to be scanned, the plurality of light fluxes deflected and scanned by a deflection surface of the common optical deflector. Further, in the configuration, when a resin imaging optical element of the first imaging optical system, closest to the optical deflector in an optical axis direction of the first imaging optical system is set as a first imaging optical element, and a resin imaging optical element of the second imaging optical system, closest to the optical deflector in an optical axis direction of the second imaging optical system is set as a second imaging optical element, the first imaging optical element includes a first standard positioning portion for positioning the first imaging optical element in a main scanning direction, the first standard positioning portion being disposed to be displaced from an optical axis of the first imaging optical system toward an image writing start side in the main scanning direction; and the second imaging optical element includes a second standard positioning portion for positioning the second imaging optical element in a main scanning direction, the second standard positioning portion being disposed to be displaced from an optical axis of the second imaging optical element toward an image writing start side in the main scanning direction.

Further, in the optical scanning apparatus, the first imaging optical element and the second imaging optical element may be formed into an identical shape by an identical mold.

Further, the following conditional expression may be satisfied:

$$0.02 \times YEA < |YP| < 0.30 \times YEA$$

where YEA denotes one of a length of an entire effective portion of the first imaging optical element in the main scanning direction and a length of an entire effective portion of the second imaging optical element in the main scanning direction, and YP denotes one of a distance from the optical axis of the first imaging optical system to the first standard positioning portion in the main scanning direction and a distance from the optical axis of the second imaging optical system to the second standard positioning portion in the main scanning direction.

Further, the present invention includes the above-mentioned optical scanning system, and an image forming apparatus including multiple image bearing members arranged on the scanned surfaces of the optical scanning apparatus to form images of different colors.

Further, the image forming apparatus may further include a printer controller configured to convert a color signal input from an external apparatus into image data of a different color, and to input the image data to each optical scanning apparatus.

The present invention can provide an optical scanning apparatus capable of reducing printed position displacement at an image end during a temperature increase to reduce registration displacement, and an image forming apparatus using the same.

Further features of the present invention become apparent from the following description of embodiments with reference to the attached drawings.

BRIEF DESCRIPTION OF THE DRAWINGS

FIG. 5 illustrates a print change of a second imaging optical system according to the first embodiment of the present invention.

FIG. 6 illustrates a relative difference in print change between the first and second imaging optical systems according to the first embodiment of the present invention.

FIG. 7 illustrates a print change of a first imaging optical system according to a comparative example.

FIG. 8 illustrates a print change of a second imaging optical system according to the comparative example.

DESCRIPTION OF THE EMBODIMENTS

Preferred embodiments of the present invention will now be described in detail in accordance with the accompanying drawings.

First Embodiment

Figure 1:
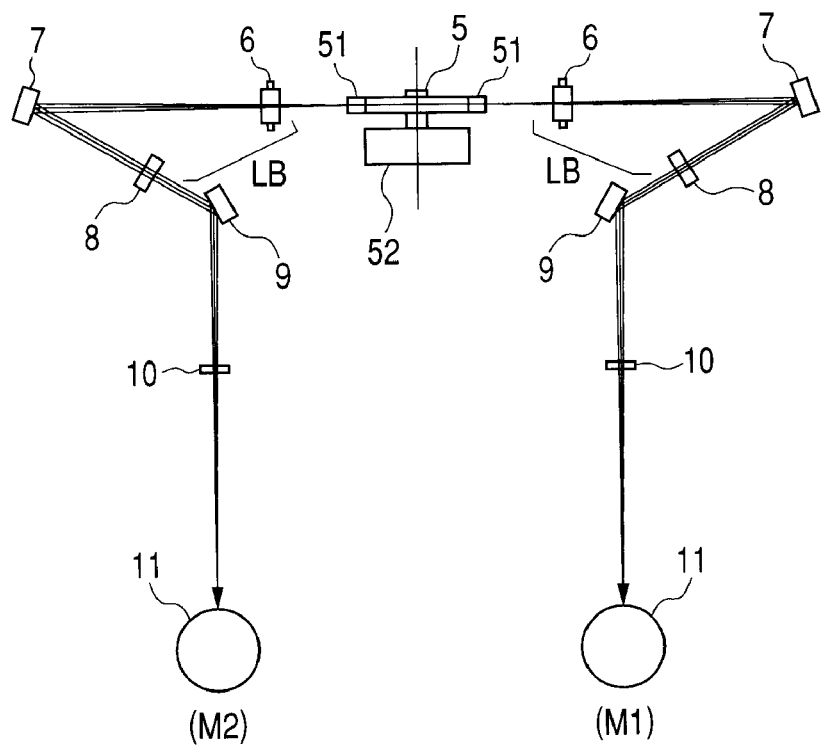
FIG. 1 is a subscanning sectional view of a first embodiment of the present invention.
Figure 2:
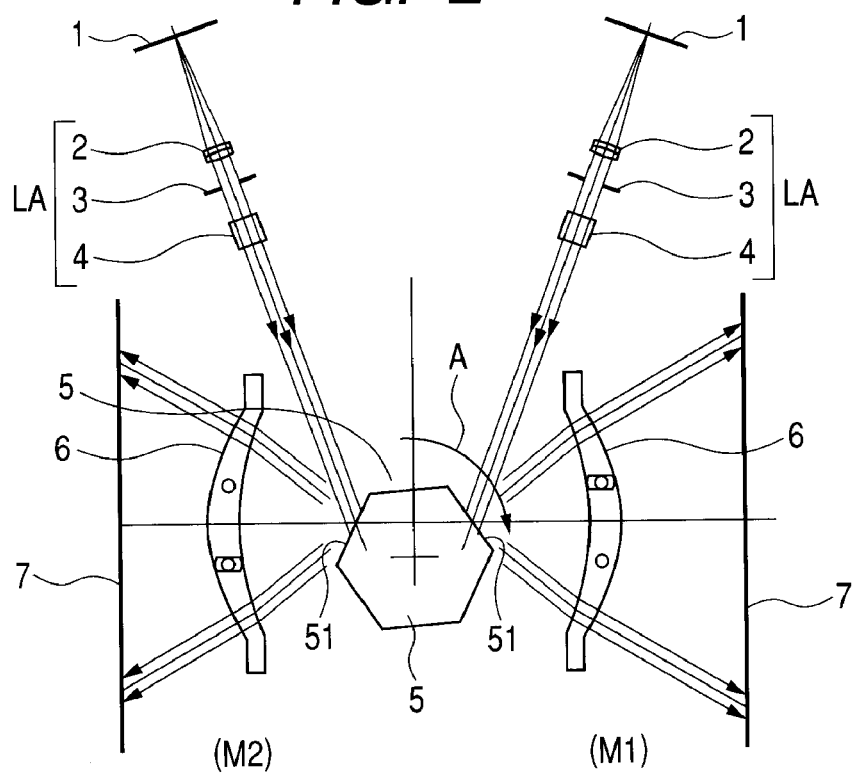
FIG. 2 is a main scanning sectional view of the first embodiment of the present invention.

FIG. 1 is a main portion sectional view of a subscanning direction (subscanning sectional view) according to a first embodiment of the present invention. FIG. 2 is a main portion sectional view of a main scanning direction (main scanning sectional view) according to the first embodiment of the present invention.

In the description below, the subscanning direction (Z direction) is a direction parallel to a rotational axis of a deflection unit. A main-scanning section is a section in which the subscanning direction (direction parallel to the rotational axis of the deflection unit) is a normal line. A main scanning direction (Y direction) is a direction in which light fluxes deflected for scanning by the deflection unit are projected on the main-scanning section. A subscanning section is a section in which the main scanning direction is a normal line.

An optical scanning apparatus of this embodiment deflects and scans multiple light fluxes from multiple light source units by different deflection surfaces of a common (single) optical deflector (polygon mirror) including multiple deflection surfaces, and optically scans different photosensitive drum surfaces via different imaging optical systems.

FIG. 1 illustrates first and second stations (scanning optical systems) M1 and M2. In this embodiment, the first and second stations M1 and M2 are similar in configuration and optical operation, and thus the first station M1 is representatively described below. Members of the second station M2 similar to those of the first station M1 are denoted by similar reference numerals, and the members of the second station M2 are described when necessary.

The first station M1 includes a light source unit 1, a condenser (collimator lens) 2 for converting a light flux emitted from the light source unit 1 into a parallel light flux, and an aperture stop 3 for regulating the parallel light flux converted by the condenser 2. The first station M1 further includes a cylindrical lens (cylinder lens) 4 for imaging the regulated light flux as a linear image extending in the main scanning direction, and a single optical deflector 5 as a deflection unit. The first station M1 further includes an imaging optical system LB as a first imaging optical system for spot-forming the light flux deflected and scanned by the optical deflector 5 on a photosensitive drum surface 11 as a scanned surface. An imaging optical system of the second station M2 is referred to as a second imaging optical system.

The imaging optical system LB includes first and second imaging lenses (scanning lenses) 6 and 8 made of resins as imaging optical elements, folding mirrors 7 and 9 for folding an optical path, and a cover glass 10.

The imaging optical system LB images a parallel light flux on the scanned surface 11 within the main scanning section. Within the subscanning section, a conjugate relationship is set between an imaged position (focused linear position) of the light flux imaged in the subscanning direction on a deflection surface 51 by the cylindrical lens 4 and the scanned surface 11, configuring so-called an optical face tangle error compensation optical system.

Each of components including the collimator lens 2, the aperture stop 3, and the cylindrical lens 4 constitutes a component of an incident optical system LA, and guides the light flux emitted from the light source unit 1 to the optical deflector 5. The collimator lens 2 and the cylindrical lens 4 may be constituted of one optical element (anamorphic lens).

The light scanning optical system of this embodiment is an in-plane deflection surface scanning optical system that performs scanning within a surface vertical to the deflection surface of the optical deflector 5 within the subscanning section as illustrated in FIG. 1. Thus, as illustrated in FIG. 2, the incident optical system LA is disposed within a paper surface that is the deflection surface 51.

In this embodiment, as described above, the similar stations (scanning optical systems) M1 and M2 are arranged left and right sandwiching the optical deflector 5 to face each other, and multiple scanned surfaces 11 and 11 are optically scanned by commonly using the optical deflector 5.

Apparently, scanning and exposing the multiple scanned surfaces 11 and 11 and superimposing images of multiple colors by known electrophotography enable formation of a color image. FIG. 1 illustrates a method of printing the two scanned surfaces 11 and 11. However, arraying two optical scanning apparatuses of FIG. 1 enables formation of a color image of four colors: yellow (Y), magenta (M), cyan (C), and black (B).

Table 1 shows specifications of the optical system of the optical scanning apparatus according to the first embodiment. In Table 2, "E-x" indicates "$10^{-x}$".

TABLE 1

| Incident angle within deflection surface | | | | |
|---|---|---|---|---|
| Surface | | R | D | N |
| Light source 1 | 1 | | 3,028 | 1.000 |
| Condenser 2 | 2 | 46.63203 | 1.00 | 1.785 |
| | 3 | 15.51899 | 2.00 | 1.582 |
| | 4 | −21.487 | 600 | 1.000 |
| Aperture stop 3 | 5 | ∞ | 5.92 | 1.000 |
| Cylinder lens 4 | 6 | Aspherical (described below) | 7.00 | 1.511 |
| | 7 | ∞ | 83.90 | 1.000 |
| Deflection reflection surface 5 | 8 | ∞ | 3,000 | 1.000 |
| First scanning lens 7 | 9 | Aspherical (described below) | 7.50 | 1.524 |
| | 10 | Aspherical (described below) | 91.00 | 1.000 |
| Second scanning lens 9 | 11 | Aspherical (described below) | 5.50 | 1.524 |
| | 12 | Aspherical (described below) | 6,600 | 1.000 |
| Cover glass 10 | 13 | ∞ | 1.80 | 1.511 |
| | 14 | ∞ | 64.70 | 1.000 |
| Scanned surface 11 | 15 | ∞ | | |

TABLE 2

| | | Aspherical shape | | | | |
|---|---|---|---|---|---|---|
| | | 6 surfaces | 9 surfaces | 10 surfaces | 11 surfaces | 12 surfaces |
| Bus line shape | R | ∞ | −6.39E+01 | −4.17E+01 | −1.16E+03 | 1.58E+03 |
| | K | 0 | −4.85E+00 | −130E+00 | 0 | −138E+03 |
| | B4 | 0 | 2.89E−07 | 7.71E−08 | 0 | −1.65E−07 |
| | B6 | 0 | −2.58E−10 | 127E−10 | 0 | 1.16E−11 |
| | B8 | 0 | −5.12E−14 | −3.67E−13 | 0 | −6.82E−16 |
| | B10 | 0 | 9.72E−17 | 1.58E−16 | 0 | 7.98E−20 |
| Sub-bus line shape | r | 44.88 | −1.00E+03 | −1.00E+03 | −1.00E+03 | −3.33E+01 |
| | D2 | 0 | 0 | 0 | 0 | 4.77E−05 |
| | D4 | 0 | 0 | 0 | 0 | −6.42E−09 |
| | D6 | 0 | 0 | 0 | 0 | 6.48E−13 |
| | D8 | 0 | 0 | 0 | 0 | −3.28E−17 |
| | D10 | 0 | 0 | 0 | 0 | 5.15E−22 |

Polygon mirror circumscribed circle φ40

Number of polygon mirror deflection surfaces 6 surfaces

Angle between incident optical system and optical axis of imaging lens 70°

Reflection point of image center light flux on polygon mirror with respect to polygon mirror center (0, 0) (15.05, 8.71)

TABLE 3

| | |
|---|---:|
| Fθm | |
| FθS | |
| G1m | |
| G1s | |
| G2m | 227.1 |
| G2s | 65.4 |
| TC | 205.5 |
| φall | 740116 |
| φ1 | −1276.9 |
| φ2 | 65.6 |
| | 266.5 |
| φ1/φall | 0.01529 |
| |1/r1| + |1/r2| | 1.4E−06 |

Expressions in this case are defined as follows.

Lens surface shape (toric shape) . . . having an aspherical shape represented by a function where the main scanning direction is up to the 10th order. With a point of intersection with an optical axis set as an origin, an optical axis direction is set as an x axis, an axis orthogonal to the optical axis within the main scanning section is set as a y axis, and an axis orthogonal to the optical axis within the subscanning section is set as a z axis. In this case, a bus line direction corresponding to the main scanning direction is represented by the following equation (1):

$$x = \frac{y^2/R}{1+\sqrt{1-(1+k)y^2/R^2}} + B_4 y^4 + B_6 y^6 + B_8 y^8 + B_{10} y^{10}$$

where R denotes a curvature radius, and k, $B_4$, $B_6$, $B_8$, and $B_{10}$ denote aspherical coefficients. A sub-bus line direction corresponding to the subscanning direction is represented by the following equation (2):

$$x = \frac{z^2/r'}{1+\sqrt{1-z^2/r'^2}}$$

where r'=$r_0$(1+$D_2 Y^2$+$D_4 Y^4$+$D_6 Y^6$+$D_8 Y^8$) is set ($r_0$ denotes a sub-bus line curvature radius on the optical axis, and $D_2$, $D_4$, $D_6$, and $D_8$ denote coefficients). In Table 3, G1m denotes a focal length of the first imaging lens in the main scanning direction; G2m, a focal length of the second imaging lens in the main scanning direction; Fθm, a combined focal length of the first and second imaging lenses in the main scanning direction; G1s and $φ_1$, a focal length and power of the first imaging lens in the subscanning direction, respectively; G2s and $φ_2$, a focal length and power of the second imaging lens in the subscanning direction, respectively; Fθs and φall, a combined focal length and power of the first and second imaging lenses in the subscanning direction, respectively; and TC, a distance from the polygon mirror to a scanned surface.

In this embodiment, a divergent light flux emitted from the light source unit 1 is converted into a parallel light flux by the condenser 2. The converted parallel light flux is converted into a desired light flux width by the aperture stop 3, then converted into a light flux to converge in the subscanning direction by the cylindrical lens 4, and condensed in proximity to one deflection surface 51 of the optical deflector 5. The light flux condensed in proximity to the deflection surface 51 forms a linear image.

The optical deflector 5 that includes multiple deflection surfaces is driven to rotate about a rotational axis vertical to the paper surface of FIG. 2 by a driving system 52. A rotational direction of the optical deflector 5 is clockwise as indicated by an arrow A of FIG. 2. A principal ray of the incident light flux guided by the incident optical system LA to the optical deflector 5 vertically enters the deflection surface 51 within the subscanning section. The light flux is deflected and scanned by an arbitrary rotationary driven deflection surface 51 to be guided to the imaging optical system (fθ lens) LB.

Figure 14:
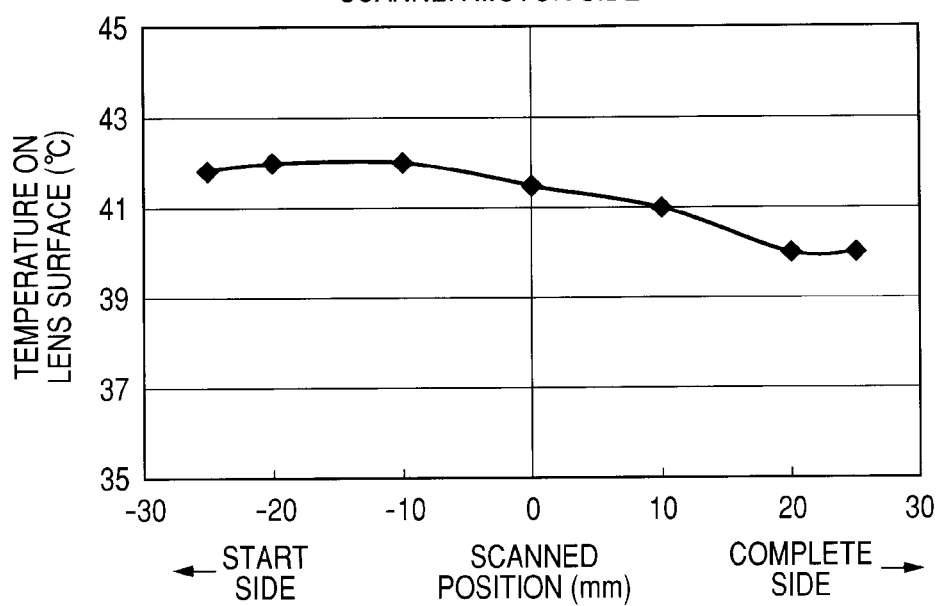
FIG. 14 illustrates a result of measuring a temperature on an imaging lens surface when a motor is continuously driven.
Figure 15:
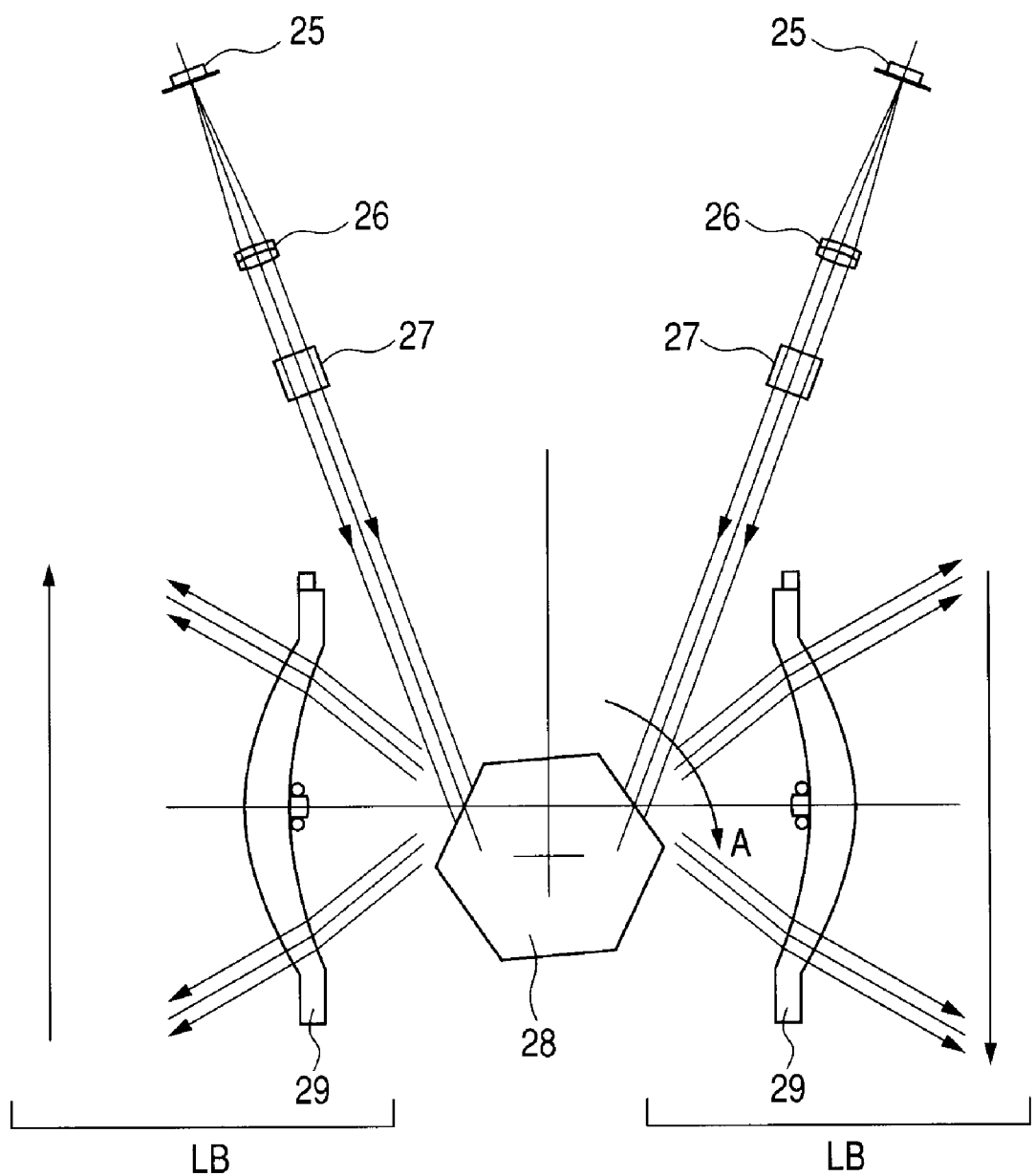
FIG. 15 is a main portion sectional view illustrating a conventional color image forming apparatus.

Heat generated from an IC chip (not shown) disposed on a substrate of a scanner motor serving as the driving system 52 or the scanner motor generates a temperature difference of from 2° C. or more to 5° C. or less between the image writing start side and the image writing complete side as illustrated in FIG. 14.

In this case, a lowered refractive index reduces refractive power (power) of the imaging lens, and hence a beam reaching position on the scanned surface moves in a direction away from the optical axis, increasing an imaging magnification (printed width).

Because of use of a resin material having a large linear expansion coefficient in addition to the change of the refractive index, the temperature increase is accompanied by expansion of a lens shape.

Within the main scanning section, the IC chip (motor driving circuit) disposed on the substrate and the scanner motor are arranged between the first and second stations M1 and M2.

Next, the optical operation of the imaging optical system LB that includes the first and second imaging lenses 6 and 8 is described.

The imaging optical system (fθ lens) LB includes two lenses: first and second imaging lenses 6 and 8 made of resins. The imaging optical system LB images the light flux deflected and scanned by the optical deflector 5 on the scanned surface 11 to form a beam spot, and scans the scanned surface 11 at a constant speed.

In this embodiment, the imaging optical system LB includes two imaging lenses. However, the present invention is not limited to this configuration, and, the imaging optical system may include a single or three or more imaging lenses.

The first and second imaging lenses 6 and 8 made of resins are manufactured by a known molding technology that fills molds with resins and takes them out after cooling. This way, manufacturing is easier than a conventional imaging lens using a glass lens.

As illustrated in Table 1, the first imaging lens 6 mainly having power in the main scanning direction has an aspherical lens shape represented by a given function. The first imaging lens 6 is a convex meniscus lens having power larger within the main scanning section than within the subscanning section, the main scanning section being a noncircular arc, and having a concave surface on the optical deflector 5 side. A shape within the main scanning section is symmetrical with respect to the optical axis. For example, the lens may employ a cylinder shape having substantially no power where incident and exit surfaces are equal in curvature in the subscanning direction but both surfaces are flat in the subscanning direction. The first imaging lens 6 mainly images the incident light flux in the main scanning direction.

As illustrated in Table 1, the second imaging lens 8 is an anamorphic lens mainly having power in the subscanning direction. The second imaging lens 8 has an aspherical lens shape represented by a given function. The second imaging lens 8 has power larger within the subscanning section than within the main scanning section, and has a shape where an incident surface of the main scanning section is circular arc and the other surface is non-circular arc.

A shape within the main scanning section is symmetrical with respect to the optical axis, and there is substantially no power in the main scanning direction in proximity of the axis. A shape of the subscanning section has a symmetrical shape with respect to the optical axis, in which an incident surface is substantially plane having an extremely small curvature and an exit surface is convex having a curvature gradually changed from on-axis to out-of-axis. The second imaging lens 8 mainly images the incident light flux in the subscanning direction and is also slightly responsible for correcting distortion aberrations in the main scanning direction.

An imaging relationship in the subscanning direction by the imaging optical system LB that includes the first and second imaging lenses 6 and 8 constitutes a so-called tilt correction system where the deflection surface 51 and the photosensitive drum 11 as the scanned surface are set in a substantially conjugate relation.

The imaging optical system LB does not always have to be represented by the function illustrated in Table 1. A known expression may be used. In order to further improve imaging performance, the imaging optical system LB may be asymmetrical with respect to the optical axis.

The light flux that has passed through the first imaging lens 6 is reflected by the first mirror 7 to enter the second imaging lens 8. The light flux emitted from the second imaging lens 8 is reflected by the second mirror 9 to pass through the cover glass 10, and guided to the photosensitive drum 11 as the scanned surface.

Figure 3:
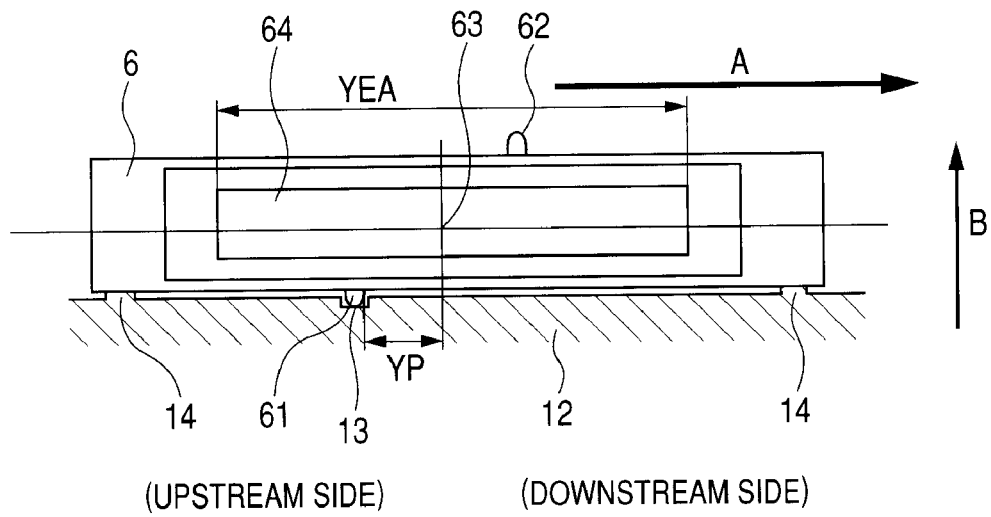
FIG. 3 is an enlarged diagram illustrating a first imaging lens according to the first embodiment of the present invention.

Next, referring to FIG. 3, an object of the present invention, that is, a unit that reduces registration displacement (color displacement) by setting equal printed position displacements of image ends during a temperature increase at the left and right imaging optical systems LB sandwiching the optical deflector 5 is described.

FIG. 3 is a front view when the first imaging lens 6 of the first station M1 of FIGS. 1 and 2 is viewed from the optical deflector 5 side. In FIG. 3, components similar to those illustrated in FIGS. 1 and 2 are denoted by similar reference numerals.

As illustrated in FIG. 2, the optical deflector 5 rotates in the direction of the arrow A. Thus, in FIG. 3, a scanning light flux is scanned on the first imaging lens 6 in the direction of the arrow A.

In FIG. 3, the first imaging lens 6 disposed adjacently to the optical deflector 5 includes main scanning direction standard positioning portions 61 and 62 disposed in different positions of the scanning direction A (positions away from an optical axis 63 in the subscanning direction and away in the main scanning direction A).

As illustrated in FIG. 3, the main scanning direction standard positioning portions 61 and 62 include protrusions that extend upward and downward (upper and lower direction) in the subscanning direction, and are positioned on both sides (opposite sides) of the scanning direction A sandwiching the optical axis 63.

The main scanning direction standard positioning portion 61 (62) is disposed on the upstream side of the optical deflector 5 in its rotational direction. In FIG. 3, a left side corresponds to an upstream side of an air flow, and a right side corresponds to a downstream side.

The first imaging lens 6 has the optical axis 63 and an effective area 64. The effective area 64 is an area in which a light flux reaching an area for forming an image on the scanned surface passes through the imaging lens.

In this embodiment, when a print range of ±156 mm is scanned on the scanned surface, a field angle of ±39.4° is set in the imaging optical system of Table 1. In this case, the effective area 64 of the first imaging lens 6 needs ±26.2 mm. A total effective area YEA of the first imaging lens 6 in the scanning direction is accordingly 52.4 mm.

A casing (housing member) 12 houses the imaging optical system LB, and includes a standard hole (standard reception portion) 13. The main scanning direction standard positioning portion 61 of the first imaging lens 6 fits in the standard hole (standard reception portion) 13.

The casing (housing member) 12 includes support portions 14 disposed in a height direction (upper and lower direction) B, and a bottom portion of the first imaging lens 6 is butted against the support portions 14. The first imaging lens 6 is fixed to the casing (housing member) 12 with a spring (not shown).

The first imaging lenses 6 of the first and second imaging optical systems LB of the first and second stations M1 and M2 are formed into similar shapes by similar molds. The first imaging lenses 6 of the first and second imaging optical systems LB of the first and second stations M1 and M2 are arranged in a status of rotating by 180° around a symmetrical axis within a plane that includes a rotational axis of the optical deflector 5 and is parallel to the scanned surface.

Thus, the first imaging lenses 6 of the first and second imaging optical systems LB of the first and second stations M1 and M2 have lens surface shapes symmetrical to the plane that includes the rotational axis of the optical deflector 5 and is parallel to the scanned surface.

In this embodiment, the main scanning direction standard positioning portion 61 (62) is positioned with respect to the standard hole (standard reception portion) 13 of the casing (housing member) 12.

In this embodiment, the total effective area YEA of the first imaging lens 6 in the scanning direction and a distance YP from the optical axis 63 to the main scanning direction standard positioning portion 61 (62) in the scanning direction are set to satisfy the following conditional expression (1):

$$0.02 \times YEA < |YP| < 0.30 \times YEA \quad (1)$$

The conditional expression (1) defines the distance YP. Advisably, an upper or lower limit of the conditional expression should not be exceeded because printed position displacement of image ends becomes large during a temperature increase.

In this embodiment, the total effective area YEA of the first imaging lens 6 in the scanning direction is set to YEA=52.4 mm as described above.

In order to satisfy the conditional expression (1), the main scanning direction standard positioning portion 61 (62) is set in a position of YP=±10 mm. In this embodiment, printed position displacement of the image ends during a temperature increase is accordingly reduced.

More preferably, a numerical value range of the conditional expression (1) is set as follows.

$$0.05 \times YEA < |YP| < 0.25 \times YEA \quad (1a)$$

In this embodiment, the distances YP of the two main scanning direction standard positioning portions 61 and 62 from the optical axis 63 in the scanning direction are equal. However, the present invention is not limited thereto, and it is only necessary that the main scanning direction standard positioning portions 61 and 62 be disposed on opposite sides of the scanning direction A sandwiching the optical axis 63.

Figure 4:
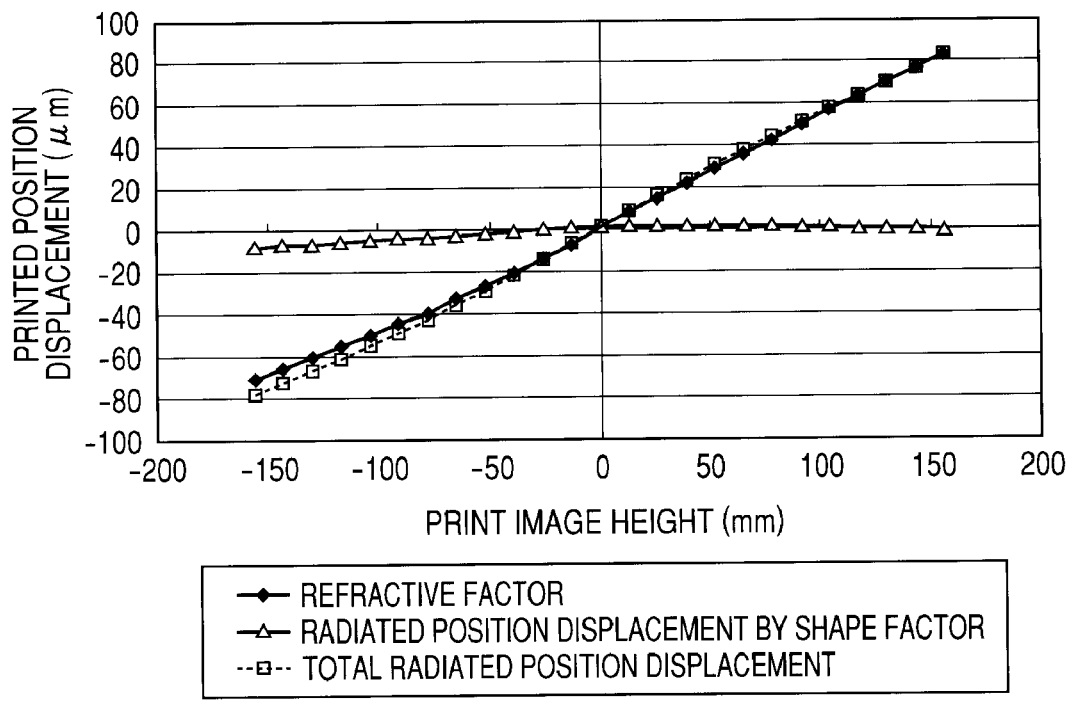
FIG. 4 illustrates a print change of a first imaging optical system according to the first embodiment of the present invention.
Figure 9:
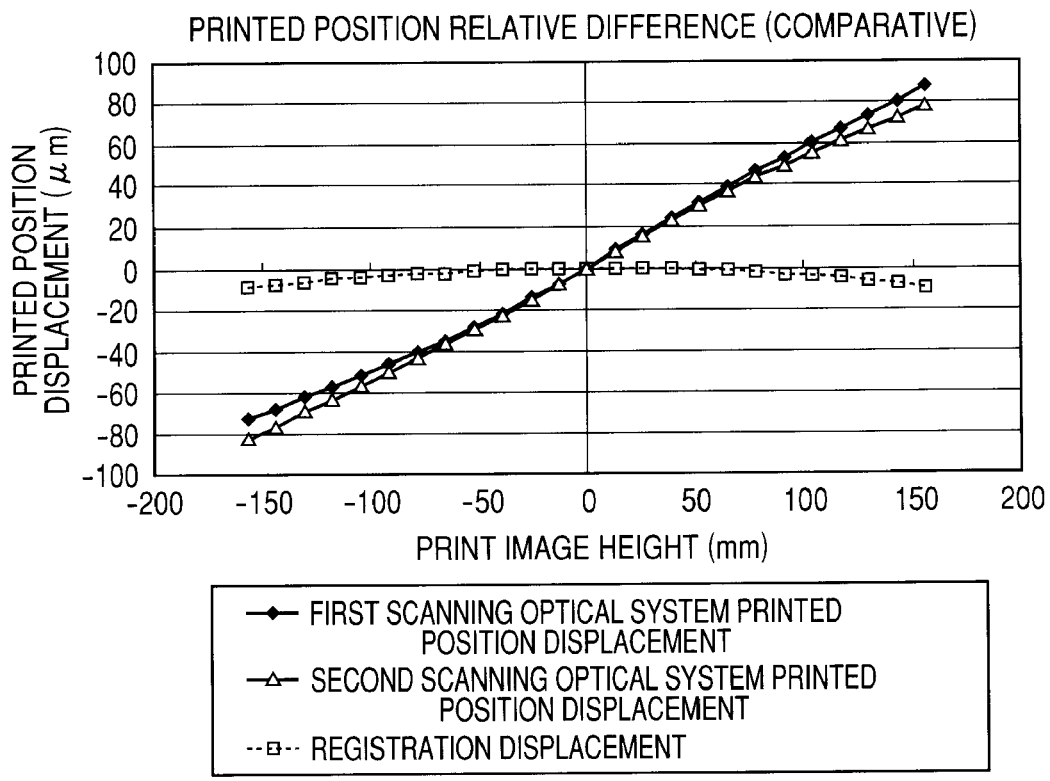
FIG. 9 illustrates a relative difference in print change between the first and second imaging optical systems according to the comparative example.

FIGS. 4 to 6 illustrate temperature increase fluctuations at printed positions of the first and second imaging optical systems LB of the first and second stations M1 and M2 according to this embodiment. FIGS. 7 to 9 illustrate temperature increase fluctuations at printed positions of the first and second imaging optical systems LB of the first and second stations M1 and M2 according to a comparative example.

FIGS. 4 and 5 illustrate printed position fluctuations (μm) when heat generated during driving of the optical deflector 5 and an air flow generated by its rotation increase a temperature of the first imaging lens 6 with respect to a printed position of ±156 mm at a normal temperature.

It is presumed that a temperature increase on an image writing start side (scanning upstream side) of the imaging lens effective portion is +17° C., and a temperature increase on an image writing complete side (scanning downstream side) is +15° C. In this case, the temperature increases are accompanied by a refractive index fluctuation of $\Delta n=0.00085/°$ C. and a linear expansion coefficient of $7\times 10^{-5}/(20$ C.·mm).

FIG. 4 illustrates printed position fluctuation caused by refractive index fluctuation of a material of the first optical imaging system of the first station M1, printed position fluctuation caused by linear expansion, and total printed position fluctuation thereof. FIG. 5 illustrates printed position fluctuation caused by a refractive index fluctuation of a material of the second imaging optical system of the second station M2, printed position fluctuation caused by linear expansion, and total printed position fluctuation thereof. FIG. 6 illustrates total printed position fluctuations of the first and second stations M1 and M2, and a printed position difference (registration displacement amount) generated between the two imaging optical systems LB.

In the comparative example of FIGS. 7 to 9, in contrast with this embodiment, it is presumed that the imaging optical system is disposed at a position YP=0 (center position of the lens) of the main scanning direction standard positioning portion. As in the case of this embodiment, in the comparative example, it is presumed that a temperature increase is +17° C. on the image writing start side (scanning upstream side) of the imaging lens effective portion and a temperature increase is +15° C. on the image writing complete side (scanning downstream side).

FIG. 7 illustrates printed position fluctuation caused by refractive index fluctuation of a material of the first imaging optical system of the first station M1, printed position fluctuation caused by linear expansion, and total printed position fluctuation thereof. FIG. 8 illustrates printed position fluctuation caused by refractive index fluctuation of a material of the second imaging optical system of the second station M2, printed position fluctuation caused by linear expansion, and total printed position fluctuation thereof. FIG. 9 illustrates total printed position fluctuations of the first and second stations M1 and M2 and a printed position difference (registration displacement amount) thereby generated between the two imagining optical systems LB.

In the comparative example of FIGS. 7 to 9, a printed position difference (registration displacement amount) generated between the two imaging optical systems LB is about 10 μm. In this embodiment of FIGS. 4 to 6, a printed position difference can be remarkably reduced to approximately 2 μm.

This embodiment of FIG. 1 is directed to the method of printing the two scanned surfaces. However, the present invention is not limited thereto, and can be employed to a form in which stations are arranged left and right with respect to one optical deflector, for example, a form illustrated in FIG. 14 in which one optical deflector scans four scanned surfaces. The number of beams for scanning each scanned surface may be one, two or more. There is no restriction in this regard.

In this embodiment, the two main scanning direction standard positioning portions 61 and 62 are configured as protrusions extending upward and downward in the subscanning direction of the first imaging lens 6. However, the two main scanning direction standard positioning portions 61 and 62 are not limited to the protrusions, and may be formed as grooves or holes in the first imaging lens 6 to be fitted with the protrusions of the casing 13. The main scanning direction standard positioning portions 61 and 62 may be configured as protrusions extending horizontally from upper and lower ribs in the subscanning direction of the first imaging lens 6.

In this embodiment, a synchronous detection optical system (BD optical system) for determining a timing of a scanning start position on the scanned surface is not illustrated, but a known system (synchronous detection system) may be employed. In other words, a system that reflects a light flux that has passed through the imaging optical system by a reflection mirror for synchronous detection to guide the light flux to a synchronous detection sensor for synchronous detection may be employed. A so-called synchronous detection separate optical path system configured to match a center ray of a light flux for synchronous detection with an optical axis of an imaging optical element for synchronous detection provided separately from the imaging optical system may be employed.

A synchronous detection optical systems may be disposed in each of the imaging optical systems of the first and second stations (scanning optical systems) M1 and M2. Alternatively, synchronous detection may be carried out only at one station, while synchronous detection may be carried out by a pseudo signal at the other.

The synchronous detection separate optical path system is more advantageous for reducing a relative difference of printed position fluctuations. This is because when the system is configured to math a center ray of a light flux for synchronous detection with the optical axis of the imaging optical element for synchronous detection, fluctuations of printed positions of on-axis image heights are small even if wavelengths of the light source units are different between the first and second stations M1 and M2.

According to this embodiment, even if temperatures of the two first imaging lenses 6 adjacent to the optical deflector 5 increase asymmetrically in the scanning direction, appropriately setting a position of the main scanning direction standard positioning portion 61 (62) enables reduction of printed image displacement of the image ends. In other words, according to this embodiment, printed position displacement caused by thermal expansion starting from the main scanning direction standard positioning portion 61 (62) away from the optical axis in the scanning direction and printed position displacement caused by asymmetrical refractive index fluctuations are combined to make equal the total printed displacements of both image ends. As a result, printed position displacements of the image ends during temperature increases are equal at the left and right imaging optical systems sandwiching the optical deflector 5, and hence registration displacement (color displacement) is reduced.

Second Embodiment

Figure 10:
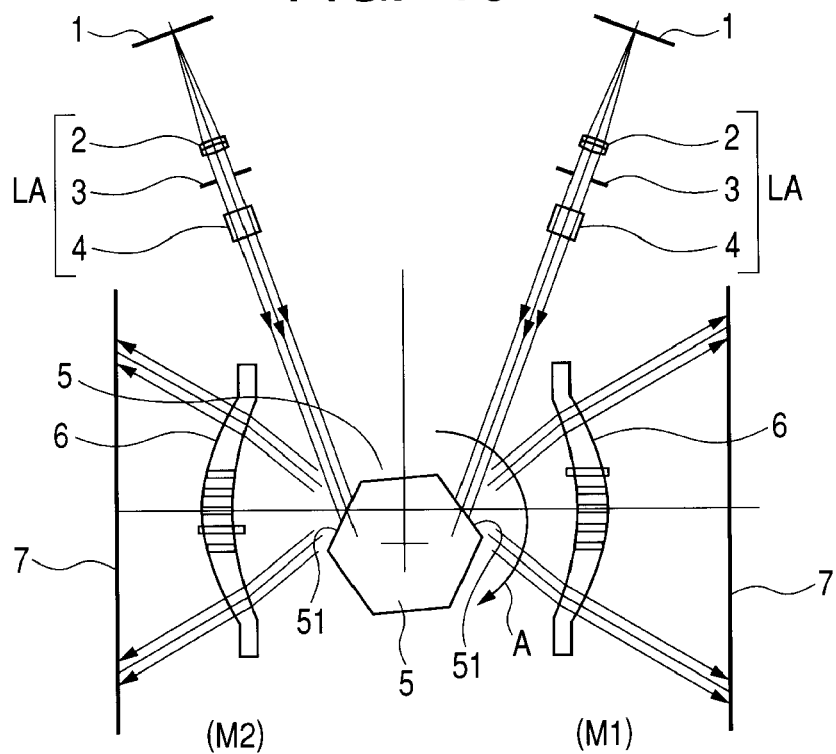
FIG. 10 is a main scanning sectional view of a second embodiment of the present invention.
Figure 11:
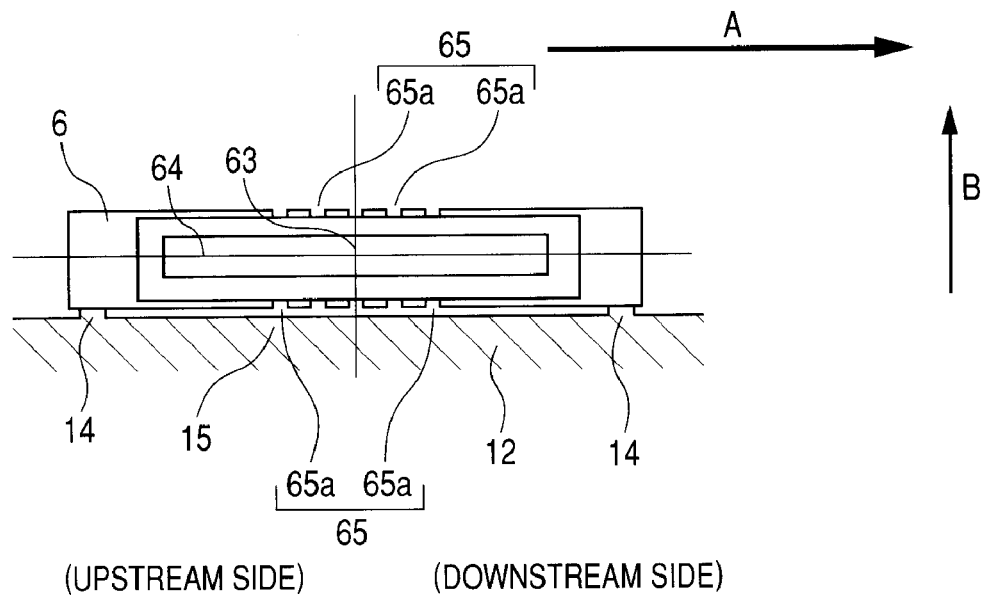
FIG. 11 is an enlarged diagram illustrating a first imaging lens according to the second embodiment of the present invention.

FIG. 10 is a main portion sectional view (main scanning sectional view) of a second embodiment of the present invention. FIG. 11 is a front diagram when a first imaging lens 6 of a first station M1 of FIG. 10 is viewed from an optical deflector 5 side. In FIGS. 10 and 11, components similar to those illustrated in FIGS. 2 and 3 are denoted by similar reference numerals.

The second embodiment is different from the first embodiment in an outer shape of the first imaging lens 6 disposed adjacently to the optical deflector 5 and holding method of the first imaging lens 6. Other components and optical operations are similar to those of the first embodiment, and hence similar effects are provided.

In this embodiment, heat generated from an IC chip (not shown) disposed on a substrate of a scanner motor or from the scanner motor generates a temperature difference of 2° C. or more to 5° C. or less between an image writing start side and an image writing complete side as illustrated in FIG. 14.

Within a main scanning section, the IC chip (motor driving circuit) disposed on the substrate and the scanner motor are arranged between first and second stations M1 and M2.

Specifically, in this embodiment, each of the two first imaging lenses 6 adjacent to the optical deflector 5 includes multiple main scanning direction standard positioning portions 65a at positions away from an optical axis 63 in a subscanning direction. According to a rotational direction of the optical deflector 5, first and second imaging optical systems LB selectively use the main scanning direction standard positioning portions 65a to determine a position at a standard reception portion 15 of a housing member 12.

A subscanning sectional view of the second embodiment is similar to that of the first embodiment illustrated in FIG. 1. Specifications of an imaging optical system of the second embodiment are similar to those of the first embodiment illustrated in Table 1.

As illustrated in FIG. 10, the optical deflector 5 rotates in a direction of an arrow A. Thus, in FIG. 11, a scanning light flux scans on the first imaging lens 6 in the direction of the arrow A.

In FIG. 11, main scanning direction standard positioning portion groups 65 are disposed in top and bottom surfaces of the first imaging lens 6 in a subscanning direction. Each of the main scanning direction standard positioning portion groups 65 includes multiple main scanning direction standard positioning portions 65a constituted of grooves.

As illustrated in FIG. 11, multiple main scanning direction standard positioning portions 65a are disposed in proximity of the optical axis 63 in a scanning direction A, sandwiching the optical axis 63. One of the multiple main scanning direction standard positioning portions 65a is selected to be disposed on an upstream side of the optical deflector 5 in its rotational direction.

The standard protrusion (standard reception portion) 15 is disposed in the casing (housing member) 12 that houses the imaging optical system LB. One of the multiple main scanning direction standard positioning portions 65a (grooves) constituting the main scanning direction standard positioning portion group 65 is fitted with the standard protrusion (standard reception portion) 15.

The casing (housing member) 12 includes support portions 14 disposed in a height direction B, and a bottom portion of the first imaging lens 6 is butted against the support portions 14. The first imaging lens 6 is fixed to the casing (housing member) 12 with a spring (not shown).

In the second embodiment, as in the first embodiment, the first imaging lenses 6 of the first and second imaging optical systems LB of the first and second stations M1 and M2 are formed into similar shapes by similar molds. The first imaging lenses 6 of the first and second imaging optical systems LB of the first and second stations M1 and M2 are arranged in a status of rotating by 180° around a symmetrical axis within a plane that includes a rotational axis of the optical deflector 5 and is parallel to the scanned surface.

Thus, the first imaging lenses 6 of the first and second imaging optical systems LB of the first and second stations M1 and M2 have lens surface shapes symmetrical to the plane that includes the rotational axis of the optical deflector 5 and is parallel to the scanned surface.

In this embodiment, the main scanning direction standard positioning portion 65a is positioned with respect to the standard protrusion (standard reception portion) 15 of the casing (housing member) 12.

In this embodiment, when a print range of ±156 mm is scanned on a scanned surface as in the case of the first embodiment, a field angle of ±39.4° is set in the imaging optical system LB of Table 1. In this case, an effective area 64 of the first imaging lens 6 requires ±26.2 mm (52.4 mm).

In this embodiment, a total effective area YEA of the first imaging lens 6 in the scanning direction is set to YEA=52.4 mm as described above.

In order to satisfy the conditional expression (1), the main scanning direction standard positioning portions 65a are disposed at five positions of YP=±5 mm and YP=±10 mm. YP=0 is set to match the optical axis in the main scanning direction, and used as a standard for reinforcing a single lens. The main scanning direction standard positioning portions 65a at the positions of YP=±5 mm and ±10 mm are selected to be positioned with respect to the standard protrusion (standard reception portion) 15 of the casing (housing member) 12. As a result, in this embodiment, printed position displacement of image ends during a temperature increase is reduced.

In this embodiment, selection of one of the multiple main scanning direction standard positioning portions 65a (grooves) as a scanning direction positioning standard depends on each product. Specifically, depending on the specifications of the imaging optical system LB, an absolute value of a temperature increase and a temperature difference differ depending on a rotational speed or direction of the polygon mirror, a rib configuration of the casing, and disposition of a light shielding wall for ghost prevention, and hence a best combination may be selected for each product.

In this embodiment, the multiple main scanning direction standard positioning portions 65a constituting each of the two main scanning direction standard positioning portion groups 65 are configured as grooves in the top and bottom surfaces of the first imaging lens 6 in the subscanning direction. However, the main scanning direction standard positioning portions 65a may not be grooves. For example, instead of grooves, multiple protrusions may be formed in the first imaging lens 6 to fit in the holes of the casing. The main scanning direction standard positioning portions may be configured as protrusions extending horizontally from the upper and lower ribs of the first imaging lens 6 in the subscanning direction.

(Color Image Forming Apparatus)

Figure 12:
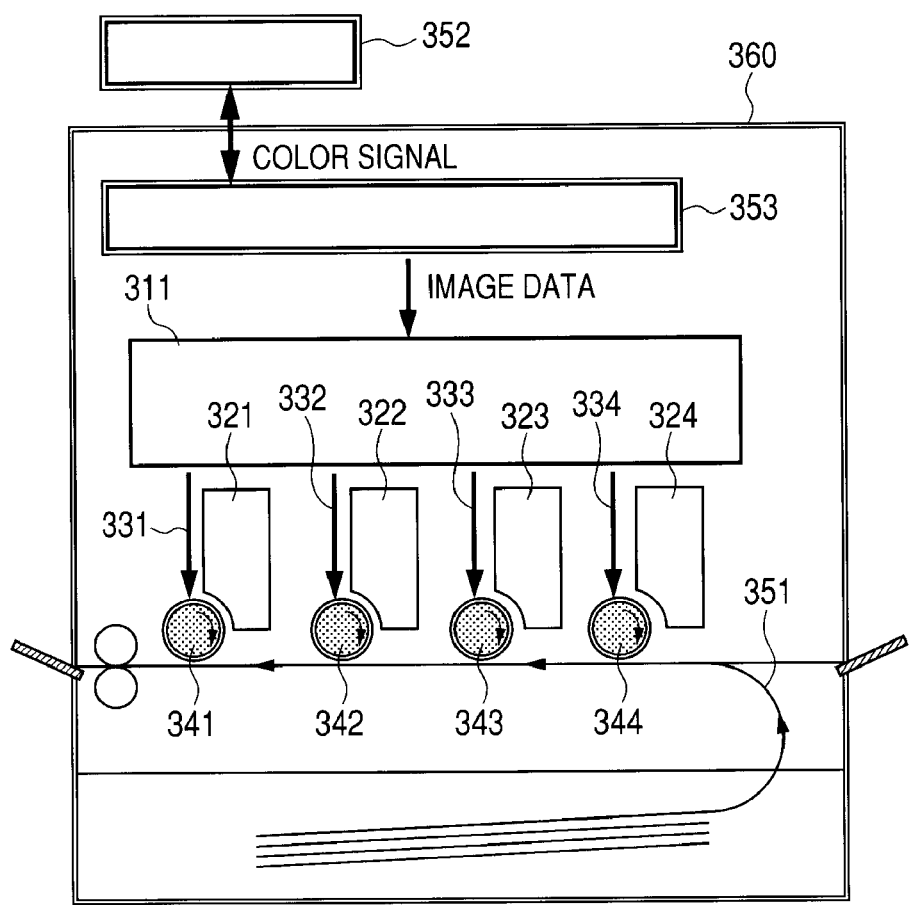
FIG. 12 is a main portion sectional view illustrating a color image forming apparatus of the present invention.
Figure 13:
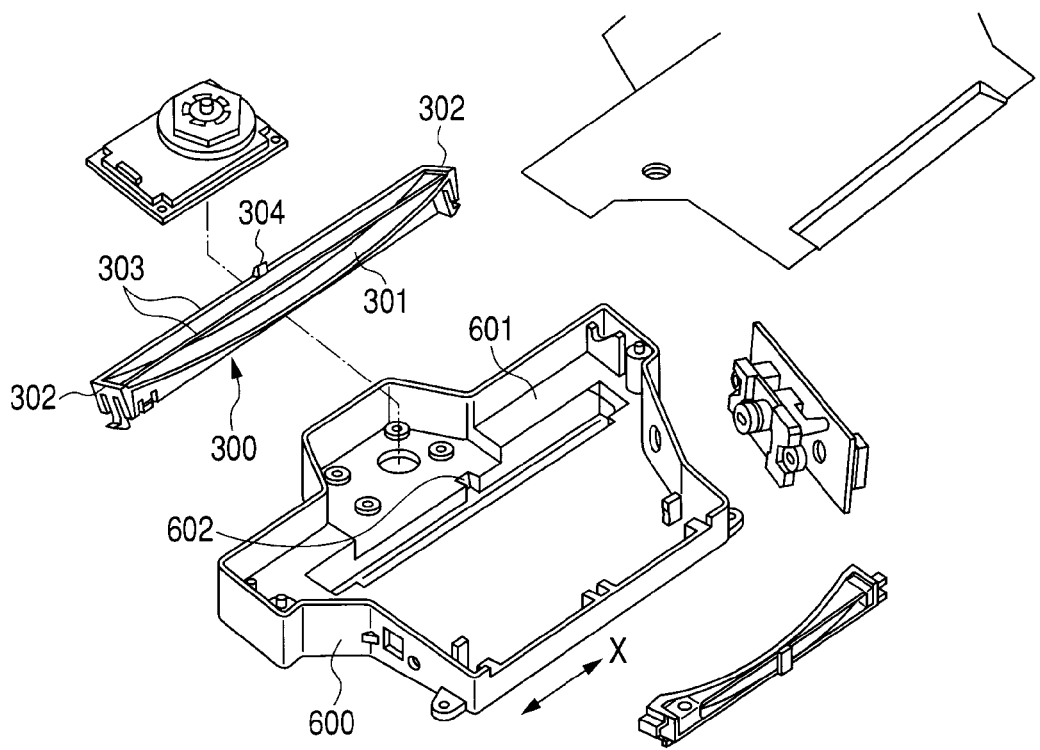
FIG. 13 is a main portion perspective diagram illustrating a method for housing an imaging lens in a casing.

FIG. 12 is a main portion schematic diagram illustrating a color image forming apparatus according to the embodiments of the present invention. This embodiment describes a tandem type color image forming apparatus in which image information is recorded on a surface of multiple photosensitive drums serving as an image bearing member. In FIG. 12, a color image forming apparatus 360 includes an optical scanning apparatus 311 as illustrated in FIG. 13, in which scanning is performed with four beams from different surfaces of the same polygon mirror. The color image forming apparatus 360 also includes photosensitive drums 341, 342, 343, and 344 each serving as an image bearing member, developing devices 321, 322, 323, and 324, and a transport belt 351.

In FIG. 12, respective color signals of red (R), green (G), and blue (B) are input from an external device 352 such as a personal computer to the color image forming apparatus 360. The color signals different from each other are converted into pieces of image data (dot data) of cyan (C), magenta (M), yellow (Y), and black (Bk) by a printer controller 353 in the color image forming apparatus. The respective pieces of image data are input to the optical scanning apparatus 311. Light beams 331, 332, 333, and 334, which are modulated according to the respective pieces of image data, are emitted from the optical scanning apparatus. The photosensitive surfaces of the photosensitive drums 341, 342, 343, and 344 are scanned with the light beams in a main scanning direction.

In the color image forming apparatus of this embodiment, the optical scanning apparatus 311 scans the four light beams each corresponding to the respective colors of cyan (C), magenta (M), yellow (Y), and black (Bk) The image signals (image information) are recorded in parallel on the surfaces of the photosensitive drums 341, 342, 343, and 344, and multiplex transferred on a recording material to thereby print a one sheet of a full color image at high speed.

For example, a color image reading apparatus including a CCD sensor may be used as the external device 352. In this case, the color image reading apparatus and the color image forming apparatus 360 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-213755, filed Aug. 22, 2008, which is hereby incorporated by reference herein in its entirety.

What is claimed is:

1. An optical scanning apparatus comprising:
a plurality of light source units;
a common optical deflector configured to deflectively scan a plurality of light fluxes emitted from the plurality of light source units; and
a first imaging optical system and a second imaging optical system arranged, within a main scanning section, to face each other across an optical axis direction and to sandwich the common optical deflector, the first imaging optical system and the second imaging optical system being configured to image, on different surfaces to be scanned, the plurality of light fluxes deflected and scanned by a deflection surface of the common optical deflector, the first imaging optical system and the second imaging optical system each having a respective resin imaging optical element, wherein:
when the resin imaging optical element of the first imaging optical system, closest to the common optical deflector in an optical axis direction of the first imaging optical systems is set as a first imaging optical element, and the resin imaging optical element of the second imaging optical system, closest to the common optical deflector in an optical axis direction of the second imaging optical systems is set as a second imaging optical element,
the first imaging optical element comprises a first standard positioning portion for positioning the first imaging optical element in a main scanning direction, the first standard positioning portion being disposed to be displaced from an optical axis of the first imaging optical system toward an image writing start side in the main scanning direction; and
the second imaging optical element comprises a second standard positioning portion for positioning the second imaging optical element in a main scanning direction, the second positioning portion being disposed to be displaced from an optical axis of the second imaging optical element toward an image writing start side in the main scanning direction, and
the following condition expression is satisfied:

$$0.02 \times YEA < |YP| < 0.30 \times YEA$$

where YEA denotes one of a length of an entire effective portion of the first imaging optical element in the main scanning direction and a length of an entire effective portion of the second imaging optical element in the main scanning direction, and YP denotes one of a distance from the optical axis of the first imaging optical system to the first standard positioning portion in the main scanning direction and a distance from the optical axis of the second imaging optical system to the second standard positioning portion in the main scanning direction.

2. An optical scanning apparatus according to claim 1, wherein the first imaging optical element and the second imaging optical element are formed into an identical shape by an identical mold.

3. An image forming apparatus comprising the optical scanning apparatus of claim 1, and a plurality of image bearing members arranged on the surfaces to be scanned of the optical scanning apparatus to form images of multiple colors.

4. An image forming apparatus according to claim 3, further comprising a printer controller configured to convert a color signal input from an external apparatus into image data, and to input the image data to the optical scanning apparatus.

* * * * *